United States Patent [19]

Martin

[11] Patent Number: 4,648,797
[45] Date of Patent: Mar. 10, 1987

[54] TORQUE CONTROL SYSTEM

[75] Inventor: Anthony N. Martin, Simsbury, Conn.

[73] Assignee: United Technologies Corporation, Hartford, Conn.

[21] Appl. No.: 562,794

[22] Filed: Dec. 19, 1983

[51] Int. Cl.$^4$ ............................................. B64C 27/57
[52] U.S. Cl. ........................................ 416/27; 416/43
[58] Field of Search ............................. 416/27, 35, 43

[56] References Cited

U.S. PATENT DOCUMENTS

| | | | |
|---|---|---|---|
| 2,959,002 | 11/1960 | Best | 416/27 |
| 2,961,052 | 11/1960 | Smith et al. | 416/35 X |
| 3,131,770 | 5/1964 | Szydlowski | 416/27 |
| 3,180,426 | 4/1965 | Crim | 416/27 |
| 3,482,805 | 12/1969 | Knemeyer | 416/43 X |
| 3,516,250 | 6/1970 | Moore | 416/25 |
| 3,744,928 | 7/1973 | Hansen et al. | 416/43 X |
| 3,963,372 | 6/1976 | McLain et al. | 416/27 X |
| 4,466,526 | 8/1984 | Howlett et al. | 416/30 X |
| 4,493,465 | 1/1985 | Howlett et al. | 416/27 X |
| 4,531,361 | 7/1985 | Zagranski et al. | 60/39.161 |

Primary Examiner—Everette A. Powell, Jr.
Attorney, Agent, or Firm—Francis J. Maguire, Jr.

[57] ABSTRACT

The dynamic instabilities in a system which controls prime mover output torque and angular velocity separately are avoided by deriving an accelerating torque signal in an output torque controller where it is added to a sensed torque signal, and the added signal is compared to a commanded torque signal, the difference signal value therebetween serving to control the output torque.

13 Claims, 5 Drawing Figures

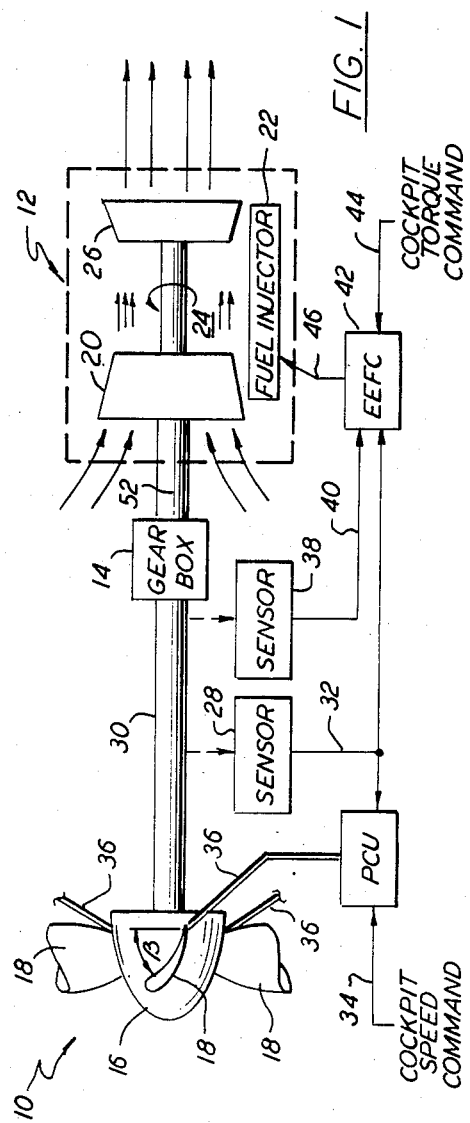
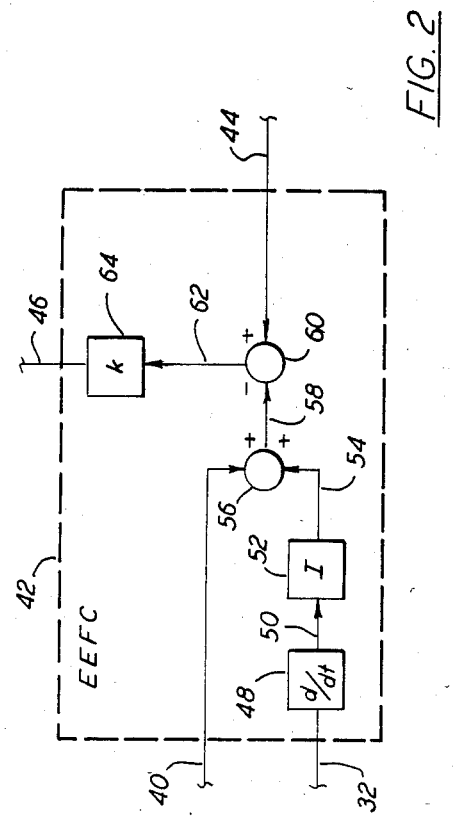
FIG. 1
FIG. 2

TORQUE CONTROL SYSTEM

DESCRIPTION

1. Technical Field

This invention relates to prime mover output torque control systems, and more particularly to an output torque control system for controlling the output torque of a prime mover that drives a load absorber capable of changing its load absorbing capacity according to the commands of an angular velocity control system.

2. Background Art

It is sometimes desirable to control the output torque of a prime mover at a selected value. Control systems for controlling output torque usually electronically compare a sensed output torque signal value to a commanded output torque signal value to obtain a difference signal value therebetween. The difference signal is usually conditioned further and ultimately used to control the output torque of the prime mover. If such a control system is used in controlling the output torque of a prime mover that drives a load absorber having the ability to have its load absorbing capacity changed by an angular velocity (speed) control system which controls the speed of the prime mover output shaft, a dynamic instability problem will arise, the severity of which depends on the natures of the prime mover, the load absorber, and the two control systems.

The dynamic instability problem usually arises during system transients resulting from a sudden change in load. If a certain increment of load is removed from the system, the speed increases and the speed control system acts to increase the capacity of the load absorber so the speed will decrease. However, at the same time, and before the speed control system can fully effectuate the speed change, the reduction in output shaft torque will be sensed by the output torque control system which then acts to increase the output torque to the selected value. The increased speed due to the sudden removal of load, and the increase in output torque due to the output torque control system attempting to restore the selected output torque value, together tend to dynamically reinforce the tendency, in an unstable manner, toward increased speed initiated by the sudden load removal. The same situation arises in the case of a sudden increase of load except in reverse. In fact, the speed control system and the output torque control system tend to oppose each other during transients. This is manifested in dynamic fluctuations in shaft torque and speed as the speed changes in response to the difference between engine supplied torque and load absorbed torque. Again, the severity of the problem depends on the characteristics of the system.

For example, in an aircraft having a two-shaft turboprop engine, separate control systems for controlling propeller speed and engine output torque are usually used. The gas generator spool consists of a hollow (hereinafter outer) shaft having a compressor and free turbine mounted thereon. The power turbine is driven by the gases exiting from the free turbine in the gas generator and is mounted on an output shaft that passes through the center of the outer shaft. The energy remaining in the gases that exit the power turbine are used for jet propulsion. However, the majority of the energy is used to turn the output shaft which is connected to a propeller through reduction gears. The propeller has variable pitch blades controlled by a propeller control unit (PCU) for controlling the angular velocity (speed) of the propeller at a selected value. A separate electronic engine fuel control (EEFC) system is provided for controlling the output torque of the engine at a selected value.

If the aircraft is operating under a condition of torque balance where the propeller absorbed torque equals the engine supplied torque and the aircraft suddenly enters a region of reduced air pressure, e.g., a warm air pocket, the propeller absorbed torque is suddenly less than the engine supplied torque. The imbalance is manifested in increased proeller speed and decreased shaft torque. The PCU will increase the angle of attack (increase drag) to increase the absorbed torque and reduce the propeller speed. However, the EEFC will increase the fuel flow to increase engine output torque and thus further increase speed, thereby opposing the PCU action. Fortunately, the increase in fuel flow will not significantly increase output shaft torque until the gas generator spool has increased in speed to supply additional airflow into the power turbine. This delay varies depending on the engine type and operating conditions. The delay permits the PCU to decrease the propeller speed and increase the absorbed torque. The increased shaft torque is immediately sensed by the EEFC and it acts to reduce fuel flow. Thus the inherent delay in the operation of the two-shaft turboprop engine dynamically decouples the PCU and EEFC control loops and the dynamic instabilities described above are significantly alleviated.

As a second example, in an aircraft having a single shaft turboprop engine, separate PCU and EEFC control systems are also used. However, in the single shaft turboprop engine there is no structurally induced dynamic decoupling of the PCU and EEFC control loops. There is no gas generator spool since the compressor and turbine are mounted on the single shaft; the turbine acts to both drive the compressor and directly power the output shaft. Therefore, there is no delay in producing a change in output torque in response to a change in fuel flow. Thus, the dynamic instability problems described above in connection with the two-shaft turboprop engine are of increased severity in the case of the single shaft turboprop engine. This results, in the prior art, in complex requirements for the EEFC control logic and constraints on the engine and propeller mode of operation to a nonoptimal steady state mode if reasonable dynamic stability for the two closed loops is to be obtained. The use of single shaft turboprop engines with automatic torque control is rare for this reason.

DISCLOSURE OF INVENTION

The object of the present invention is to avoid dynamic instabilities in a system in which the output torque and the angular velocity of the output shaft of the prime mover are controlled separately.

According to the present invention, the difference signal value between a commanded torque signal value and a sensed absorbed torque signal value is modified by adding the value of a torque transient signal to the sensed absorbed torque signal value thereby providing a summed engine output torque signal value for comparison with the commanded torque signal value. In further accord with the present invention, the torque transient signal is obtained by amplifying a signal indicative of the time derivative of the angular velocity of the output shaft, i.e., its angular acceleration by a factor proportional to the rotational inertia of the system, thereby providing an accelerating torque signal having a value exactly equal to but oppositely signed from the change in value of the sensed absorbed torque signal, the addition of the accelerating torque signal value to the sensed absorbed torque signal value ensuring that the commanded torque and the summed engine output torque signal values remain in balance during transient conditions thereby permitting the angular velocity control system to correct transient speed disturbances that affect output torque in relative isolation.

The torque control system of the present invention avoids dynamic instabilities in systems where the output torque and angular velocity of the prime mover are separately controlled by dynamically isolating the two control loops. The extremely simple and elegant means by which this is accomplished is based upon the insight that the amount by which the absorbed torque changes may be exactly balanced by the accelerating torque. Complex requirements for the EEFC control logic are not required and the engine and load absorber are permitted to operate in the optimum steady state mode without constraints. The implementation of the invention is easy and inexpensive and should lead to increased use of certain engine types, especially single shaft turboprops.

These and other objects, features and advantages of the present invention will become more apparent in light of the following detailed description of a best mode embodiment, as illustrated in the accompanying drawings.

BRIEF DESCRIPTION OF THE DRAWINGS

FIG. 1 is a system block diagram of a single shaft turboprop engine system that utilizes the present invention;

FIG. 2 is a system block diagram of a torque control system according the the present invention;

BEST MODE FOR CARRYING OUT THE INVENTION

Figure 3:
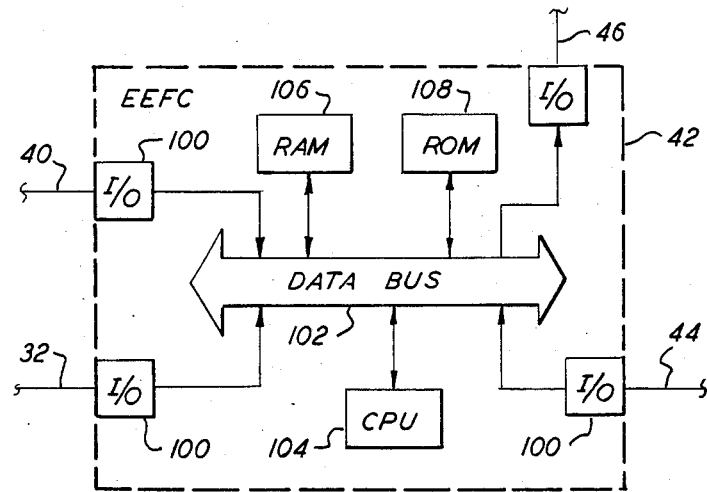
FIG. 3 is a system block diagram of a solid state digital torque control system according to the present invention.

In FIG. 1, a turboprop powerplant 10 for an aircraft having both propeller and jet output thrust is shown. A single shaft gas turbine 12 is attached by means of a gearbox 14 to a propeller 16 having variable pitch blades 18.

The turboprop engine receives air in flight through ducts and flows axially into a compressor 20. After compression the air is mixed with fuel injected by means of a fuel injector 22 into a combustion chamber 24. After ignition, the fuel burns intensely which forces the hot gases at high velocity and with great energy into the blades of a turbine 26 spinning at many thousands of revolutions per minute. The turbine absorbs most of the available energy from the hot gases to drive the compressor directly and the propeller through reduction gears in the gearbox 14. The energy remaining in the gases after being used to turn the turbine wheel are discharged as exhaust gases which are utilized in jet propulsion.

While in flight, a sensor 28 senses the angular velocity ($\omega$) of a propeller shaft 30 which drives the propeller and is driven by the gearbox. The sensor 28 provides an angular velocity ($\omega$) signal on a line 32 which is presented to a propeller control unit (PCU) which compares the sensed angular velocity or speed to a cockpit propeller speed command signal on a line 34, and which adjusts the pitch of the propeller blades 18 to maintain the commanded speed. To increase speed, an angle ($\beta$) is decreased so that the blade presents less opposition to the atmosphere. Similarly, if a decrease in speed is called for, the angle $\beta$ is increased (the blade is moved toward "feather") and since more of the blade's cross-sectional area is presented, in rotation, to the atmosphere, a slowing effect is exerted on the propeller. Linkages 36 are connected between each blade and the PCU.

A sensor 38 senses the torque absorbed by the propeller and its shaft and provides an absorbed torque signal on a line 40 to an electronic engine fuel controller (EEFC) 42. The EEFC is also presented with a cockpit torque command signal on a line 44 and the angular velocity signal on the line 32. The EEFC provides a fuel flow signal on a line 46 to the fuel injector 22 which injects fuel into the combustion chamber 24 according to the magnitude of the signal on the line 46.

In FIG. 2 is illustrated the EEFC 42 of FIG. 1 in more detail. The sensed angular velocity ($\omega$) on the line 32 is differentiated with respect to time in a differentiator 48 which provides an angular acceleration ($\alpha$) signal on a line 50 to an amplifier 52. The amplifier 52 multiplies the value of the angular acceleration ($\alpha$) signal on the line 50 by a factor directly proportional to the known rotational inertia (I) of the powerplant 10. This includes the rotating parts in the power train of FIG. 1, i.e., the turbine 26, the compressor 20, a common output shaft 52, rotating reduction gears 14, the propeller shaft 30, and the propeller 16 with its attached blades 18. The amplifier 52 provides an accelerating or a decelerating (depending on the direction of the change in angular velocity) torque signal on a line 54 to a summing junction 56 where the sensed absorbed torque signal on the line 40 is added thereto. A combined engine output torque signal on a line 58 is provided to a summing junction 60 where the combined engine output torque signal magnitude is subtracted from the magnitude of the cockpit torque command signal on the line 44.

It is an important teaching of my invention that a single shaft turboprop engine for an aircraft can have speed and torque controlled separately in a very simple and inexpensive manner without causing dynamic instabilities. In the steady state, the torque output of the engine ($\Gamma_o$) is equal to the torque absorbed ($\Gamma_a$) by the rotating parts of the system, i.e., $\Gamma_o = \Gamma_a$. If there is a disturbance which causes either an acceleration or deceleration of the output shaft angular velocity, the amount of torque absorbed by the propeller will change and the engine will be either supplying too much or too little output torque ($\Gamma_o$). The PCU will act to restore the balance between the actual velocity and the commanded velocity and the EEFC will act to restore the torque balance. Of course, it is dynamically undesirable to permit the EEFC to attempt to restore the torque balance because the velocity imbalance will be corrected by the PCU which will have the effect of restoring the torque balance as well. In order to prevent the EEFC from attempting to restore the torque balance, a torque quantity equal to but oppositely signed from the amount by which the absorbed torque ($\Gamma_a$) increases or decreases during the disturbance must be added to the absorbed torque ($\Gamma_a$) to maintain the balance, i.e., $$\Gamma_o = \Gamma_a + \Gamma_\delta$$

where $\Gamma_\delta$ is a torque quantity having a magnitude equal to the amount ($\Delta$) by which $\Gamma_a$ deviates from $\Gamma_o$, but having the opposite sign.

If the angular velocity ($\omega$) signal on the line 32 is differentiated and the resulting angular acceleration ($\alpha$) signal on the line 50 is multiplied by a constant representing the rotational inertia (I) of the powerplant, an exact measurement of the present value of the amount of torque necessary to restore the torque balance is obtained. Therefore, if the torque quantity $\Gamma_\delta$ is made equal to I[dw/dt] and is added to the absorbed torque ($\Gamma_a$), the resulting engine output torque ($\Gamma_o$) equation becomes:

$$\Gamma_o = \Gamma_a + I(dw/dt)$$
$$= \Gamma_a + I\alpha.$$

Thus, the balance between the torque command signal and the torque absorbed signal sought to be maintained by the EEFC which would otherwise be disturbed by the disturbance to the propeller, is maintained. In this way, the propeller disturbance is masked from the torque control loop and dynamic instabilities that would otherwise be present are eliminated.

Referring back to FIG. 2, the difference between the cockpit torque command signal on the line 44 and the combined signal on the line 58 is presented as a difference signal on a line 62 to an amplifier 64 which amplifies the difference signal to the level necessary to control the fuel injector 22 of FIG. 1.

In FIG. 3, is illustrated a best mode digital embodiment of the EEFC of the system block diagram of FIG. 2. The digital EEFC includes I/O ports 100 for receiving data signals on the lines 32, 40, and 44. Each of these input signals is provided through their respective I/O ports to a data bus 102. The data bus communicates with a central processing unit (CPU) 104, a random access memory (RAM) 106 and a read only memory (ROM) 108. The ROM includes routines for differentiating the angular velocity signal on the line 32 with respect to time, for multiplying the resulting angular acceleration value by the rotational inertia of the system, for adding the resulting accelerating or decelerating torque signal to the sensed absorbed torque signal (the combined signal representing the engine output torque in an output torque signal), for subtracting the engine output torque signal from the engine cockpit torque command signal on the line 44 and providing the difference signal magnitude as the fuel flow control signal on the line 46. Of course, the actual instructions in the routines stored in ROM are executed by the CPU 104. The RAM 106 is used to store data and to store intermediate and final values obtained in the calculations executed by the CPU in executing the instructions contained in ROM.

Figure 4:
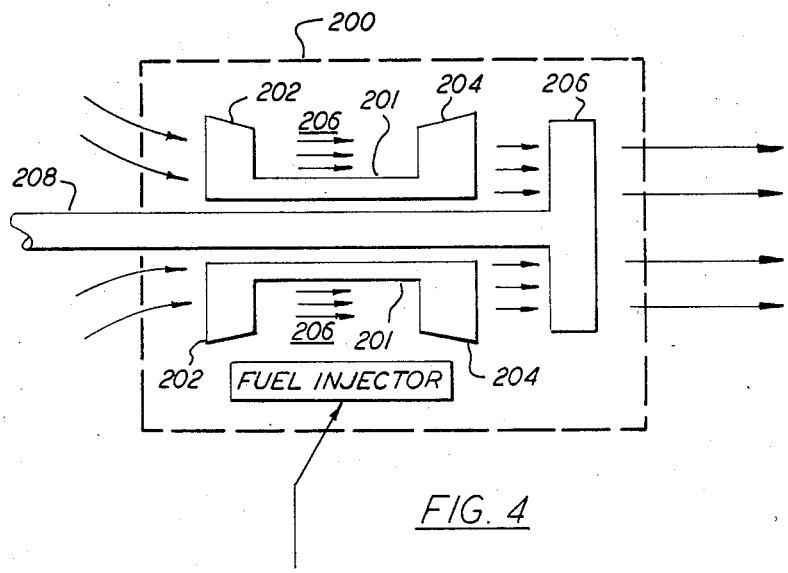
FIG. 4 is a system block diagram of a two-shaft turboprop engine.

It should be understood that the use of the invention is not restricted to controlling the output torque of a single shaft turboprop engine. It may as easily be used in controlling the output torque of a two-shaft turboprop. FIG. 4 is a simplified illustration of such a turboprop engine 200. In the illustration, an outer shaft 201 has a compressor 202 mounted at the air intake end and a free turbine 204 mounted at the other end. The intake air is compressed and mixed with fuel in a combustion chamber 206 where the mixture is ignited and the resulting hot gases strike the free turbine 204 blades causing the outer shaft and the compressor to rotate at high speed. Hot gases exit the free turbine at a reduced, but still high velocity, striking the blades of a power turbine 206 which causes an output shaft 208 to rotate at a high velocity. Since the direct mechanical connection between the engine gas generator and the output shaft that exists in the single shaft turboprop is eliminated in the two-shaft turboprop by substituting the aerodynamic coupling that exists between the free turbine and the power turbine, the PCU and EEFC control loops are dynamically decoupled to a significant extent. This decoupling is due to the time lag between an increase in fuel flow and an increase in output shaft 208 torque. An increase in fuel flow will not significantly increase output shaft torque until the gas generator spool (i.e., the compressor 202, the free turbine 204, and the outer shaft 201) has increased in speed to supply additional air flow into the power turbine. This delay typically varies between 0.3 and 3.0 seconds dependent on engine type and operating conditions. As a result of this decoupling effect, the dynamic instabilities found in the single shaft turboprop engine are significantly alleviated in the two-shaft turboprop engine. However, although the need for the invention is therefore not as great in the two-shaft turboprop output torque control loop, it is still very useful in dynamically decoupling the speed and torque control loops to an even greater extent than already exists.

Figure 5:
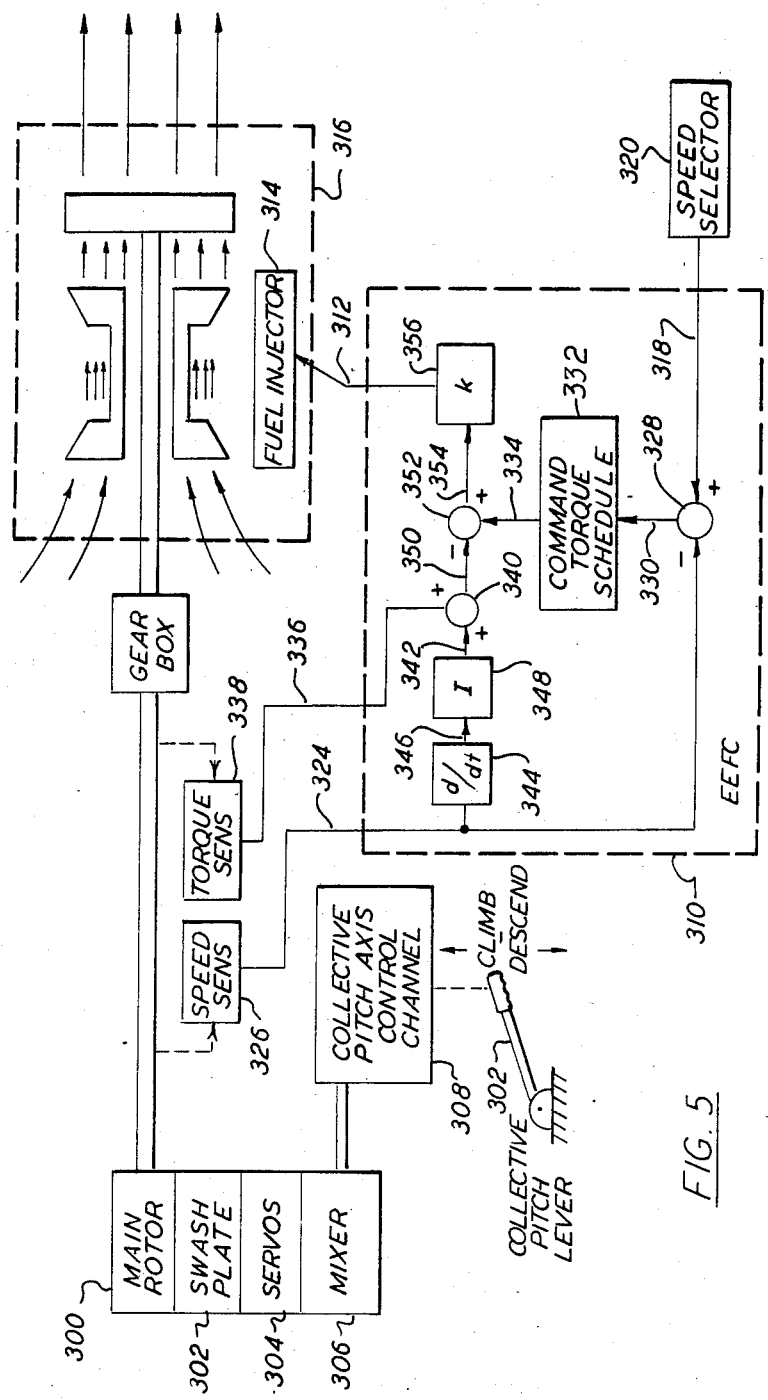
FIG. 5 is a system block diagram of a torque control according to the present invention for controlling the output torque of a two-shaft turboprop engine in a helicopter.

It should also be understood that the invention may be used in helicopters having turboshaft engines. As shown in FIG. 5, the propeller 16 of FIG. 1 is replaced by a set of rotary wings, i.e., a main rotor 300 which has blades that are varied in pitch by a collective pitch lever 302. The pitch of the blades is changed by a swashplate 302 in response to primary servos 304, which relate to the various controllable axes of the swashplate 302. The servos 304 are controlled by a mixer 306 which combines inputs from the three blade pitch axes of the helicopter, including a collective pitch axis control channel 308. The collective pitch lever or stick 302 is usually to the left of the pilot's seat and is operated with the left hand. This lever is pulled up to increase the pitch angle of all the main rotor 300 blades and lowered to decrease the pitch. An increase in pitch increases the angle of attack of each blade thereby increasing the drag, the lift and the altitude. The increased power required to maintain main rotor speed during such a maneuver is effectuated by an electronic engine fuel controller (EEFC) 310. The EEFC causes a change in a fuel flow signal on a line 312 to a fuel injector 314 in a two-shaft turboprop engine 316, the signal having the effect of increasing the fuel flow and the engine output power. A downward movement of the collective pitch lever decreases the blade pitch, the angle of attack, the drag, the lift, tends to increase main rotor and engine RPM, and through the EEFC, the downward movement causes a decrease fuel flow signal on the line 312 to appear so as to maintain main rotor RPM.

The EEFC is responsive to an engine speed command signal on a line 318 from a speed selector 320. The magnitude of an acutal sensed speed signal on a line 324 from a speed sensor 326 is subtracted from the magnitude of the engine speed command signal on the line 318 at a junction 328 which provides a speed difference signal on a line 330 to a device 332 which provides a torque command signal on a line 334, in response to the various values of the speed difference signal on the line 330, according to a preselected command torque schedule. Inherent in the structure of the command torque schedule are various known aerodynamic factors which together permit the device 332 to select a particular command torque signal magnitude on the line 334 in response to a corresponding speed difference signal magnitude on the line 330.

The EEFC 310 is also responsive to a sensed absorbed torque signal on a line 336 from a torque sensor 338. The magnitude of the sensed absorbed torque signal on the line 336 is added, at a junction 340, to the magnitude of an accelerating (or decelerating) torque signal on a line 342. The time derivative of the sensed speed signal on the line 324 is taken at a differentiator 344 which provides an acceleration signal on a line 346 to an amplifier 348 which multiplies the magnitude of the acceleration signal by a factor proportional to the known rotational inertia of the connected rotating parts of the powerplant. The magnitude of a summed signal on a line 350 represents the total torque delivered by the engine and is subtracted from the magnitude of the commanded torque signal on the line 334 at a junction 352 which provides a difference signal on a line 354 to an amplifier 356 having an amplification factor k which provides the difference signal to the fuel injector 314 at the proper magnitude.

It should be understood that the case of propeller pitch changing (in the aircraft of FIG. 1) to maintain uniform propeller speed while at the same time maintaining a uniform torque on the system represents a different design philosophy than the case of the helicopter. In the helicopter varying loads require varying torque to maintain a uniform rotor speed. The use of a two-shaft engine 316 provides dynamic stability as discussed above in connection with FIG. 4. Nevertheless, the additional stability provided by the use of my invention in the case of a helicopter is still very desirable. In other words, while the practice of the invention is essential in order to achieve dynamic stability in the case of the aircraft of FIG. 1, it is desirable but not essential in the case of the helicopter of FIG. 5, since some degree of dynamic stability is inherent in the use of a two-shaft engine.

It should also be understood that although my description of a best mode embodiment has included an EEFC as applied to a turboprop engine, the practice of my invention has wider applications. Generally, it may be used to regulate the output torque of any prime mover where the prime mover's angular velocity is also regulated.

It should also be understood that although the accelerating torque signal has been added to the absorbed torque signal in both FIGS. 2 and 5 and in the verbal description accompanying FIG. 3, it may equivalently be subtracted from either the command torque signal or the difference signal between the command torque signal and the absorbed torque signal. The accelerating torque signal has been consistently described herein as being added to the sensed absorbed torque signal merely to aid in teaching the concepts.

It should also be understood that although my invention has been described throughout this specification as relating to prime movers having exclusively rotating parts, my invention may also be used in systems having prime movers with outputs which describe non-rotary motion, including rectilinear motion. In that case, the practice of the invention would be in the context of a prime mover having the output force of its stroke controlled separately from its linear velocity. The absorbed force would be measured and added to an accelerating force obtained by multiplying the time derivative of the sensed velocity by the mass of the moving parts to obtain a combined value and subtracting the combined value from the commanded force value, the difference value being used to control the output force of the prime mover.

Although the invention has been shown and described with respect to a best mode embodiment thereof, it should be understood by those skilled in the art that the foregoing and various other changes, omissions and deletions in the form and detail thereof may be made therein without departing from the spirit and scope of this invention.

I claim:

1. Apparatus for providing a signal for controlling the output torque of a prime mover driving a load in a system having rotating parts of known rotational inertia including an output shaft controlled at a commanded torque value, the output shaft controlled at a commanded angular velocity by controlling the load absorbing capacity of the load, the system having signals associated therewith having magnitudes indicative of the actual angular velocity, a commanded torque value and an actual sensed torque value, comprising:

means responsive to changes in the actual angular velocity signal for providing a load torque transient signal indicative of the presence of a changing load torque, said load torque transient signal having a present value indicative of the present value of said changing load torque; and summing means, responsive to said torque transient signal, to the commanded torque signal and to the sensed torque signal for adding the present values thereof for providing a prime mover output torque error signal compensated for load torque transients for controlling the output torque of the prime mover.

2. The apparatus of claim 1, wherein said means responsive to changes in the actual velocity signal includes:

means for determining the time derivative of the actual angular velocity signal for providing a derivative signal having a magnitude indicative thereof; and means responsive to said derivative signal for multiplying the present value thereof by a factor indicative of the total rotational inertia of the prime mover and driven load, thereby providing said load torque transient signal.

3. Apparatus for providing a fuel flow signal for controlling the output torque of an aircraft single shaft turboprop engine of known rotational inertial at a commanded torque value by controlling engine fuel flow, the engine output shaft having a propeller and shaft of known rotational inertia attached by means of gears thereto controlled at a commanded angular velocity by controlling the pitch of the propeller blades, the aircraft having signals associated therewith having magnitudes indicative of the actual propeller angular velocity, a commanded torque value and an actual sensed torque value, comprising:

means responsive to the signal indicative of actual propeller angular velocity for providing a load torque transient signal indicative of the presence of a changing load torque exerted on the propeller shaft, said load torque transient signal having a present value indicative of the present value of said changing load torque; and summing means, responsive to said load torque transient signal, to the commanded torque signal and to the sensed torque signal for adding the present values thereof for providing an engine output torque error signal as a fuel flow signal compensated for load torque transients for controlling the fuel flow and hence the output torque of the engine.

4. The apparatus of claim 3, wherein said means responsive to the signal indicative of actual propeller angular velocity includes:

means for determining the time derivative of the actual propeller angular velocity signal and providing a derivative signal having a magnitude indicative thereof; and means responsive to said derivative signal for multiplying the present value thereof by a factor indicative of the total rotational inertia of the single shaft turboprop engine, the rotating gears, the propeller and shaft, thereby providing said load torque transient signal.

5. Apparatus for providing a fuel flow signal for controlling the output torque of an aircraft two-shaft turboprop engine having a gas generator with a free turbine for driving a compressor on an outer shaft, and having a power turbine on an inner output shaft fluidly coupled to said gas generator for driving the inner shaft at a commanded output torque value by controlling engine fuel flow, the power turbine and inner shaft having a known rotational inertia, the engine output shaft having a propeller and shaft of known rotational inertia attached by means of gears thereto controlled at a commanded angular velocity by controlling the pitch of the propeller blades, the aircraft having signals associated therewith having magnitudes indicative of the actual propeller angular velocity, a commanded torque value and an actual sensed torque value, comprising:

means responsive to the signal indicative of actual propeller angular velocity for providing a load torque transient signal indicative of the presence of a changing load torque exerted on the propeller shaft, said load torque transient signal having a present value indicative of the present value of said changing load torque; and summing means, responsive to said load torque transient signal, to the commanded torque signal and to the sensed torque signal for adding the present values thereof for providing an engine output torque error signal as a fuel flow signal compensated for load torque transients for controlling the fuel flow and hence the output torque of the engine.

6. The apparatus of claim 5, wherein said means responsive to the signal indicative of actual propeller angular velocity includes:

means for determining the time derivative of the actual propeller angular velocity signal and providing a derivative signal having a magnitude indicative thereof; and means responsive to said derivative signal for multiplying the present value thereof by a factor indicative of the total rotational inertia of the power turbine, the inner shaft, the rotating gears, and the propeller and shaft, thereby providing said load torque transient signal.

7. Apparatus for providing a fuel flow signal for controlling the output torque of an helicopter single shaft turboprop engine of known rotational inertia at a commanded torque value by controlling engine fuel flow, the engine having a rotor and rotor shaft of known rotational inertia attached by means of gears thereto controlled at a commanded angular velocity by controlling the pitch of the rotor blades, the helicopter having signals associated therewith having magnitudes indicative of the actual rotor angular velocity, a commanded torque value and an actual sensed torque value, comprising:

means responsive to the signal indicative of actual rotor angular velocity for providing a load torque transient signal indicative of the presence of a changing load torque exerted on the rotor shaft, said torque transient signal having a present value indicative of the present value of said changing load torque; and summing means, responsive to said load torque transient signal, to the commanded torque signal and to the sensed torque signal for adding the present values thereof for providing an engine output torque error signal as a fuel flow signal compensated for load torque transients for controlling the fuel flow and hence the output torque of the engine.

8. The apparatus of claim 7, wherein said means responsive to the signal indicative of actual rotor angular velocity includes:

means for determining the time derivative of the actual rotor angular velocity signal and providing a derivative signal having a magnitude indicative thereof; and means responsive to said derivative signal for multiplying the present value thereof by a factor indicative of the total rotational inertia of the single shaft turboprop engine, the rotating gears, and the rotor and rotor shaft, thereby providing said load torque transient signal.

9. Apparatus for providing a fuel flow signal for controlling the output torque of a helicopter two-shaft turboprop engine having a gas generator with a free turbine for driving a compressor on an outer shaft and a power tubine on an inner output shaft fluidly coupled to said gas generator for driving the inner shaft at a commanded output torque value by controlling engine fuel flow, the power turbine and inner shaft having a known rotational inertia, the engine output shaft having a rotor and rotor shaft of known rotational inertia attached by means of gears thereto controlled at a commanded angular velocity by controlling the pitch of the rotor blades, the helicopter having signals associated therewith having magnitudes indicative of the actual rotor angular velocity, a commanded torque value and an actual sensed torque value, comprising:

means responsive to the signal indicative of actual rotor angular velocity for providing a load torque transient signal indicative of the presence of a change in the load torque exerted on the rotor shaft, said torque transient signal having a present value indicative of the present value of said change in load torque; and summing means, responsive to said load torque transient signal, to the commanded torque signal and to the sensed torque signal for adding the present values thereof for providing an engine output torque error signal as a fuel flow signal compensated for load torque transients for controlling the fuel flow and hence the output torque of the engine.

10. The apparatus of claim 9, wherein said means responsive to the angular velocity signal includes:
   means for determining the time derivative of the actual rotor angular velocity signal and providing a derivative signal having a magnitude indicative thereof; and
   means responsive to said derivative signal for multiplying the present value thereof by a factor indicative of the total rotational inertia of the power turbine, the inner shaft, the rotating gears, and the rotor and rotor shaft, thereby providing said load torque transient signal.

11. Apparatus for controlling the output torque of an engine in a system in which the output speed of the engine is controlled at a selected speed, comprising:
   means responsive to a sensed engine output speed signal for providing a load torque transient signal indicative of the magnitude of any load torque transients present; and
   summing means, responsive to the load torque transient signal, to a commanded engine output torque signal and to a sensed engine output torque signal for adding the load torque transient signal, the commanded engine output torque signal and the sensed engine output torque signal for providing a compensated engine output torque error signal for controlling the output torque of the engine.

12. The apparatus of claim 11, wherein the means responsive to a sensed engine output speed signal comprises a differentiator for providing an acceleration signal and further comprises a gain proportional to the total rotational inertia of the engine and load, the gain responsive to the acceleration signal for providing the load torque transient signal.

13. The apparatus of claim 11, wherein the summing means comprises:
   first summing means responsive to the sensed engine output torque signal and to the load torque transient signal for providing a summed signal having a magnitude indicative of the summation of the sensed engine output torque and any load torque transient present; and
   second summing means responsive to the summed signal and the commanded engine output torque signal for providing the engine output torque error signal.

* * * * *

UNITED STATES PATENT AND TRADEMARK OFFICE
CERTIFICATE OF CORRECTION

PATENT NO. : 4,648,797
DATED : March 10, 1987
INVENTOR(S) : Anthony N. Martin

It is certified that error appears in the above-identified patent and that said Letters Patent is hereby corrected as shown below:

Column 2, line 11.   Cancel "proeller" and substitute -- propeller --

Column 5, line 16,   Cancel "I[dw/dt] and substitute -- I[d$\omega$/dt] --

Column 5, line 20.   Cancel "$\Gamma_o = \Gamma_a + I(dw/dt)$"
and substitute -- $\Gamma_o = \Gamma_a + I(d\omega/dt)$ --

Column 8, line 57.   Cancel "inertial" and substitute -- inertia --

Signed and Sealed this

First Day of March, 1988

Attest:

DONALD J. QUIGG

*Attesting Officer*     *Commissioner of Patents and Trademarks*